(12) United States Patent
Zarnowitz et al.

(10) Patent No.: US 11,119,586 B2
(45) Date of Patent: Sep. 14, 2021

(54) ADJUSTABLE POINTING DEVICES

(71) Applicant: Hewlett-Packard Development Company, L.P., Spring, TX (US)

(72) Inventors: Arthur H. Zarnowitz, Palo Alto, CA (US); Rahul Patil, Taipei (TW); Glenn Wong, Palo Alto, CA (US); Greg Cerny, Palo Alto, CA (US); ShuChun Hsiao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,835

(22) PCT Filed: Dec. 21, 2017

(86) PCT No.: PCT/US2017/067850
§ 371 (c)(1),
(2) Date: Mar. 19, 2020

(87) PCT Pub. No.: WO2019/125458
PCT Pub. Date: Jun. 27, 2019

(65) Prior Publication Data
US 2020/0310560 A1    Oct. 1, 2020

(51) Int. Cl.
*G06F 3/0354* (2013.01)
(52) U.S. Cl.
CPC .. *G06F 3/03543* (2013.01); *G06F 2203/0333* (2013.01)
(58) Field of Classification Search
CPC .................. G06F 3/03543; G06F 2203/0333
(Continued)

(56) References Cited

U.S. PATENT DOCUMENTS 5,260,696 A * 11/1993 Maynard, Jr. ........... G06F 3/039
                                                    345/163
D372,906 S   8/1996 Kawauchi et al.
(Continued)

FOREIGN PATENT DOCUMENTS

CN    201378302    1/2010
CN    201489470    5/2010
(Continued)

OTHER PUBLICATIONS

Brown, D., "Cougar 700m-Laser Mouse with Aluminum Frame and Adjustable Form", Jul. 8, 2014, 5 pages http://www.wovow.org/cougar-700m-laser-mouse-aluminum-frame-adjustable-form/.
(Continued)

*Primary Examiner* — Mark Edwards
(74) *Attorney, Agent, or Firm* — Brooks Cameron & Huebsch PLLC

(57) ABSTRACT

An adjustable pointing device is disclosed wherein the device comprises a base, a grip portion, and an adjusting mechanism, the grip portion being attached to the base by the adjusting mechanism wherein the adjusting mechanism comprises an elastic member biasing the grip portion away from the base and comprising a locking mechanism movable between a locked position in which the locking mechanism is to prevent the grip portion from moving relative to the base and an unlocked position in which the locking mechanism is to allow the grip portion to move relative to the base.

15 Claims, 3 Drawing Sheets

(58) Field of Classification Search
USPC .......................................................... 345/163
See application file for complete search history.

(56) References Cited

U.S. PATENT DOCUMENTS

| | | | |
|---|---|---|---|
| D405,072 S | 2/1999 | Tso | |
| 5,870,081 A * | 2/1999 | Wu | G06F 3/03543 |
| | | | 345/163 |
| D411,189 S | 6/1999 | Liao et al. | |
| D426,216 S | 6/2000 | Lee et al. | |
| D505,677 S | 5/2005 | Sheehan et al. | |
| 7,623,117 B2 | 11/2009 | Hsu | |
| D712,903 S | 9/2014 | Lai | |
| D718,310 S | 11/2014 | Moon et al. | |
| D744,485 S | 12/2015 | Young et al. | |
| 9,348,436 B2 | 5/2016 | Lo | |
| 2005/0134565 A1 | 6/2005 | Hong | |
| 2012/0001850 A1 | 1/2012 | Li | |
| 2012/0105330 A1 | 5/2012 | Ma et al. | |
| 2013/0249798 A1 | 9/2013 | Wang et al. | |
| 2015/0022451 A1* | 1/2015 | Drougge | G06F 3/03543 |
| | | | 345/163 |

FOREIGN PATENT DOCUMENTS

| | | |
|---|---|---|
| CN | 301337135 | 9/2010 |
| CN | 203465682 | 3/2014 |
| JP | 2009282565 | 12/2009 |
| TW | 299862 | 3/1997 |
| WO | WO-2013103315 A3 | 10/2013 |

OTHER PUBLICATIONS

"Combaterwing 4800 DPI Adjustable Optical Mechanical Gaming Mouse Programmable 10 Button USB Wired Mice Competitive Game Mouse", Super Deals Live, 2017, 4 pages.

Kowaliski, C., "Razer Unveils Adjustable Mouse with 8200 DPI Sensor", Jul. 26, 2012, 4 pages http://techreport.com/news/23319/razer-unveils-adjustable-mouse-with-8200-dpi-sensor.

"Mad Catz R.a.t Pro S Optical Gaming Mouse—5000 Dpi—Adjustable Palm Rest—Onboard Memory (mcb4372200a6)", Vuugo, 2012, 2 pages.

"User manual Macally Height Adjustable Pop-Up Mouse MMOUSE", Jan. 2, 2015, 1 page, http://www.pdf-manuals.com/macally-height-adjustable-pop-up-mouse-mmouse-140400-manual.

* cited by examiner

ADJUSTABLE POINTING DEVICES

BACKGROUND

Peripheral devices, in particular, pointing devices are common devices for interacting with a main device, for example, a computer, a television, or any other device that may be provided with user inputs.

A pointing device can be any device that receives a movement from the user and causes a corresponding movement of a cursor on the main device. Pointing devices may be, e.g., mice, track balls, track pads, etc.

DETAILED DESCRIPTION

Pointing devices have a geometry adapted to fit most users. Nonetheless, in the case of long-term users, e.g., game enthusiasts, a pointing device having an adjusting mechanism that allows the user to modify the shape of the pointing device to be more ergonomic or that fits the user better is desired. For example, a slightly missized pointing device may cause the user's hand to cramp or cause other discomfort when used for long periods of time.

In the foregoing, reference is made to the accompanying drawings. The examples in the description and drawings should be considered illustrative and are not to be considered as limiting to the specific example or element described. Multiple examples may be derived from the following description and/or drawings through modification, combination or variation of certain elements. Although certain features are shown and described in conjunction, they may be applied separately to the pointing devices of this description, also, if not specifically required to be included together. Furthermore, it may be understood that examples or elements that are not literally described may be derived from the description and drawings by a person of ordinary skill in the art.

Figure 1A:
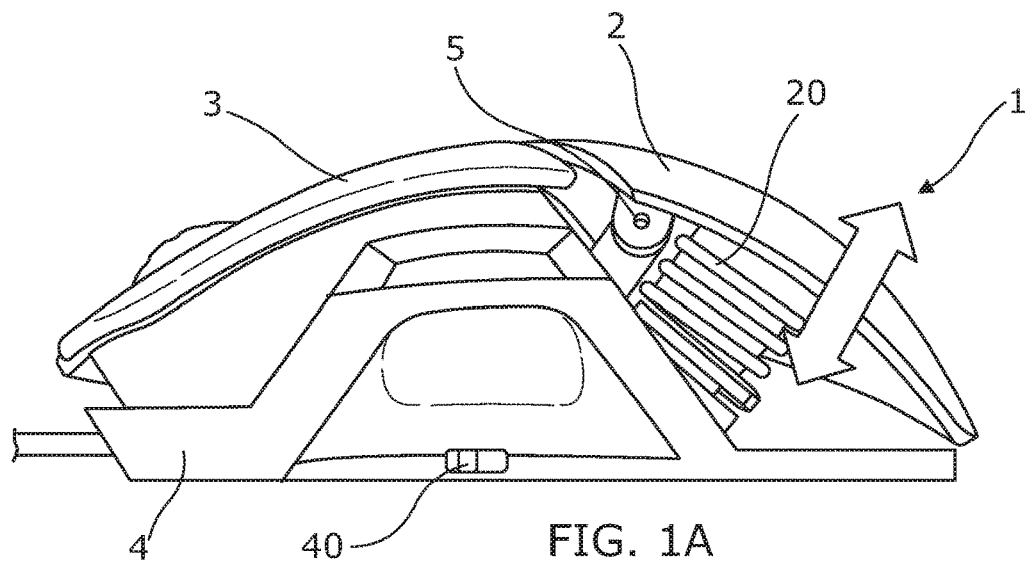
FIG. 1A shows a side view of an example of a pointing device.
Figure 1B:
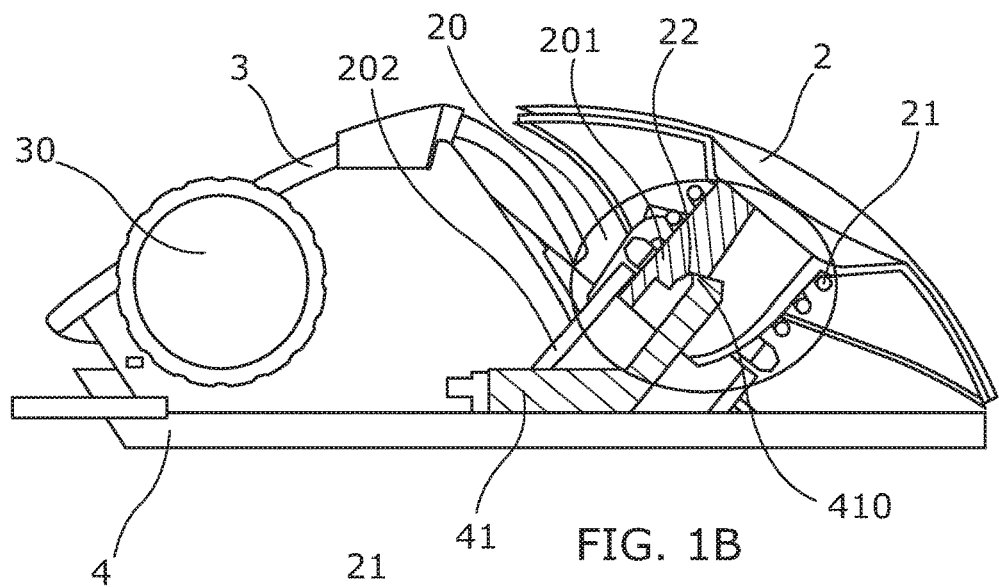
FIG. 1B shows a longitudinal section of the pointing device of FIG. 1A
Figure 1C:
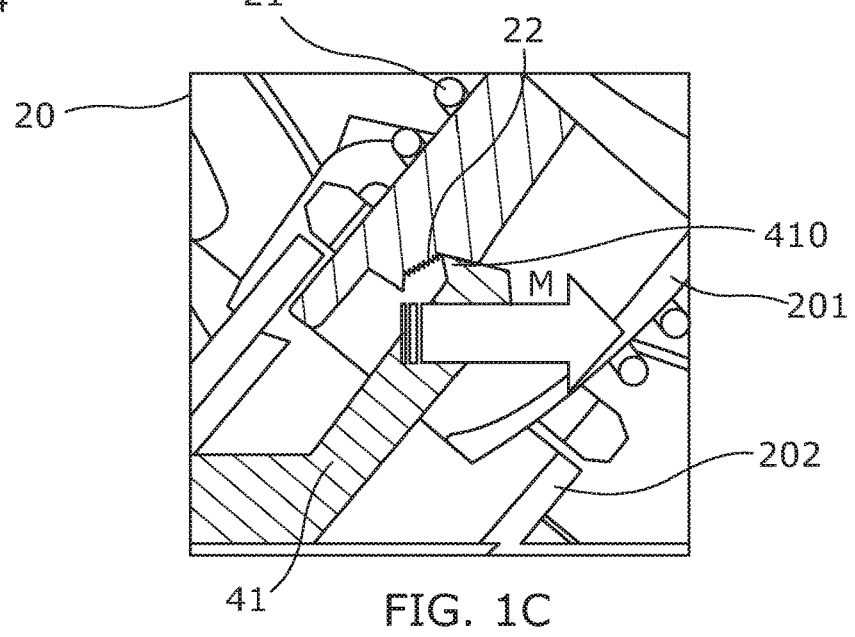
FIG. 1C shows a detailed view of an adjusting mechanism of the pointing device of FIGS. 1A and 1B.

FIGS. 1A, 1B and 1C show an example of a pointing device, in particular, a mouse, for use, e.g., in a computing system. In particular, FIG. 1A shows a pointing device 1 having a base 4, a grip portion 2 installed on the base 4 and a user input element 3 that may comprise elements such as a switches for performing click actions or any other type of mechanisms to acquire a user input.

Further, the pointing device 1 comprises an adjusting mechanism 20 for modifying the shape of the pointing device to accommodate a user. In the example of FIG. 1A the adjusting mechanism 20 is to modify the separation distance between at least part of the grip portion 2 and the base 4.

In the example of FIG. 1A, the adjusting mechanism 20 comprises a column intermediate to the base and the grip portion and interconnects the base to the grip portion. Therefore the column defines the separation distance between the grip portion 2 and the base 4, and such separation distance may be configurable by the adjusting mechanism 20.

Also, the adjusting mechanism 20 comprises a switch 40 adapted to lock the column at a determined separation distance. The switch may be located on the base 4 of the pointing device 1. The location of the switch 40 in the base allows for the user to actuate on it while being in the ergonomic position that he would take during the use of the device and, furthermore, allows one-handed operation of the switch 40 and adjustment of the separation distance by the user. In the example of FIG. 1A, the switch 40 is a switch that slides longitudinally along the base 4, however, other types of switches, such as a push button that slides transversally along the base 4, are envisaged.

FIG. 1B shows a cross section wherein the internal elements of the pointing device 1 are illustrated. FIG. 1B shows in more detail the user input element that comprises a scroll wheel 30.

Further, the adjusting mechanism 20 is shown in more detail wherein the column is a telescopic column, i.e., having an external body 202 that is fixed to the base 4 and at least an internal body 201 that is telescopic to the external body 202 with the ability to move with respect to it.

FIG. 1C shows a detailed view of an example wherein the adjusting mechanism 20 comprises a gear assembly to control the separation distance, i.e., the length of the column. In the example of FIG. 1B, the gear assembly is envisaged as a primary toothed element 22 and a secondary toothed element 410. The secondary toothed element is complementary to the primary toothed element, i.e., having at least a tooth that fits between a pair of teeth of the primary toothed element.

In an example, a modification of the length of the column implies a relative movement in the gear assembly, in particular, between the primary and secondary toothed element. This may be accomplished, e.g., by attaching one of the primary or secondary toothed element to the external body 202 of the column and the other to the internal body 201.

In an embodiment, the gear assembly may be replaced by other types of equivalent mechanisms such as, for example, frictional engagement mechanisms and/or pin and lock engagement mechanisms.

Also, FIGS. 1B and 1C show that the switch is connected to the gear assembly by means of a locking mechanism, in this case, a rod 41. The locking mechanism may be, e.g., slidingly attached to the base and connected to the switch 40.

The example of locking mechanism of FIGS. 1B and 1C is attached to the base, and upon a movement M, the switch may move from a locked position (as shown in FIG. 1C) to an unlocked position wherein the secondary toothed element 410 is displaced away from the primary toothed element 22 thereby allowing it to move. This displacement may be a displacement that completely disengages the gear assembly or a displacement that partially disengages the gear assembly allowing it to move with certain restrictions. For example, the rod 41 may have an elastic component that allows a movement of the primary toothed element 22 if a force is exerted by the user causing the secondary toothed element 410 to engage between a different set of teeth of the primary toothed element 22. The example of the partial disengagement provides a feature wherein the column is moved in identifiable steps between pairs of teeth of the primary toothed element 22 which facilitates the locking in a determined position by a user.

Also, the adjusting mechanism 20 may comprise an elastic member 21 to bias the column to extend, i.e., to increase the separation distance or to move the grip portion 2 away from the base 4. Elastic members can include, amongst others, springs, gas canisters, or any element capable of recovering size and shape after a deformation, for example, a deformation caused by a compressing force.

In an example, the pointing device 1 may also comprise a second grip portion defined by the input element 3. Such second grip portion may be installed to maintain a fixed distance with the base or may comprise separation distance adjusting means. For example, the second grip portion may also comprise a similar adjusting mechanism or may be attached to the adjusting mechanism 20 of the grip portion 2.

In a further example, the grip portion 2 may also be attached to the base by a hinge 5 located in an intermediate structure. The use of a hinge as a further attachment element (in addition to the column) allows for the grip portion 2 to also rotate thereby accommodating the user and improving the ergonomics of the pointing device 1 by modifying the inclination of the grip portion 2. For example, the hinge 5 may be located towards the center of the pointing device 1 to maintain the continuity of the shape near the center while allowing an end away from the center of the pointing device 1 to travel a large distance.

Figure 2A:
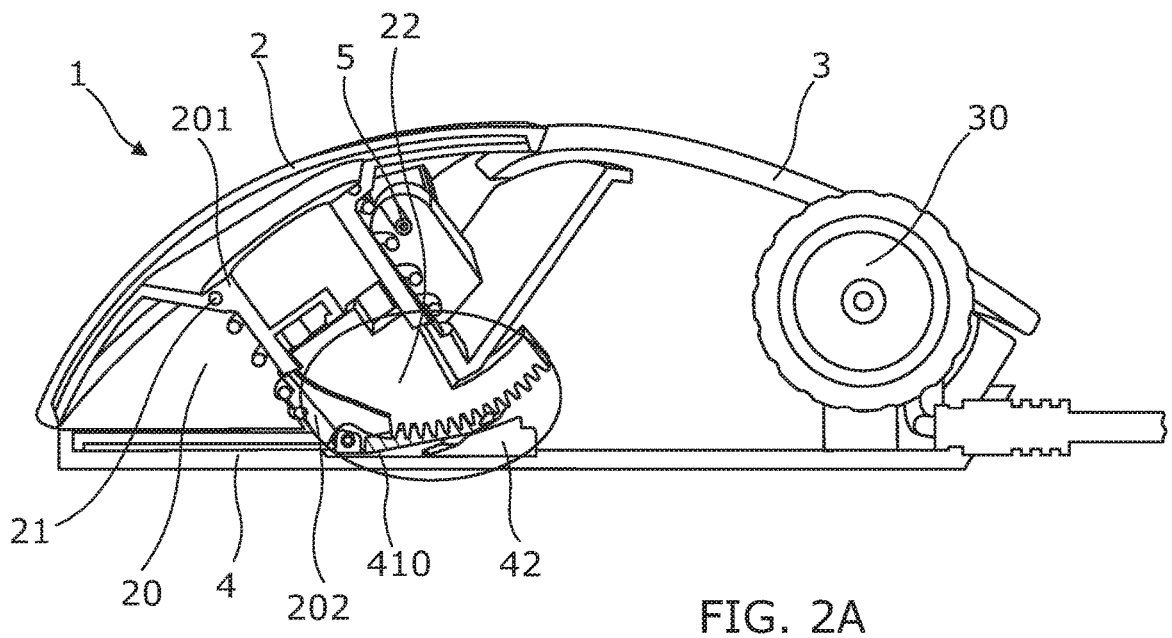
FIG. 2A shows a longitudinal section of another example of a pointing device.
Figure 2B:
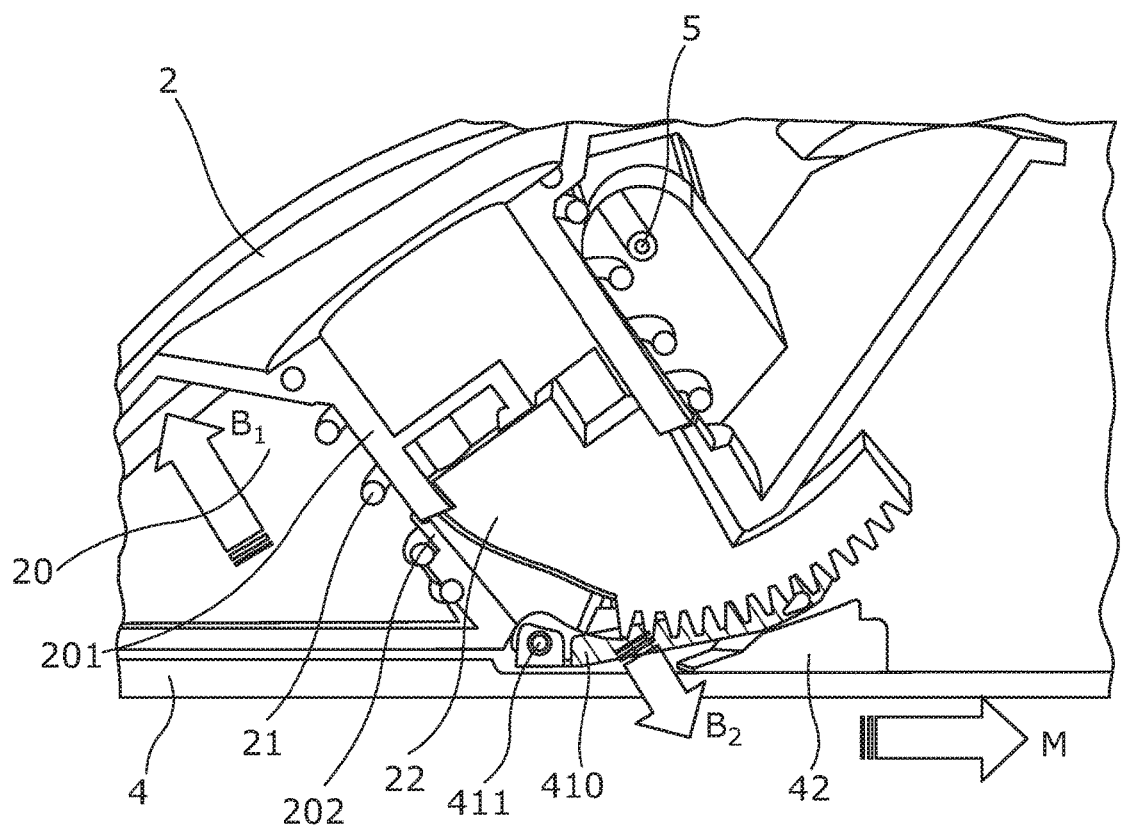
FIG. 2B shows a detailed view of the adjusting mechanism of FIG. 2A.
Figure 2C:
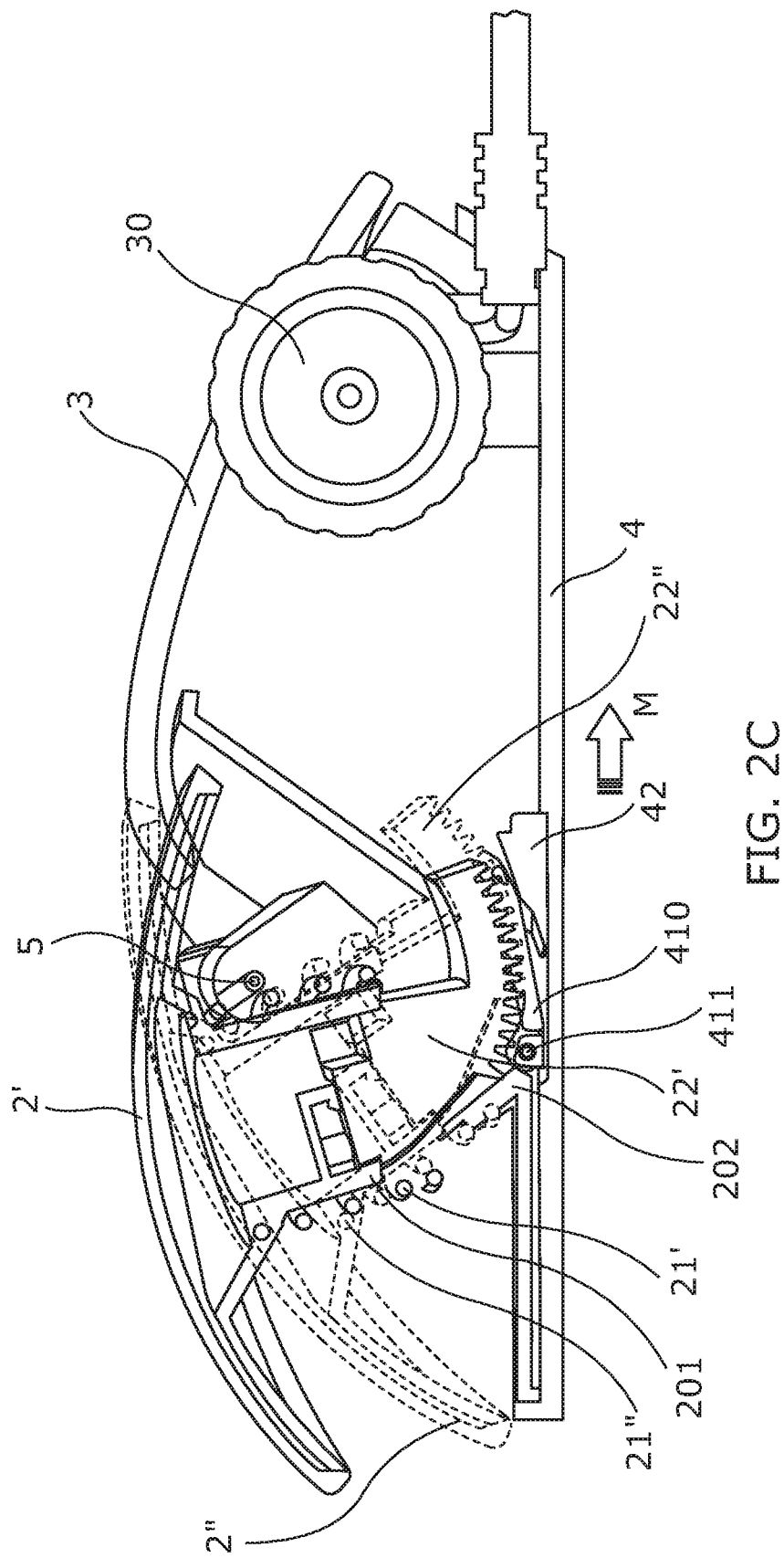
FIG. 2C shows the pointing device of FIG. 2A in two different positions of the adjusting mechanism.

FIGS. 2A, 2B and 2C show another example of a pointing device 1 also comprising a grip portion 2, an input element 3 and an adjusting mechanism 20.

The adjusting mechanism 20 of the example of FIGS. 2A, 2B and 2C is also a gear assembly wherein a primary toothed element 22 is configured to engage a secondary toothed element 410. The primary toothed element 22 may be a section of a pinion, and the secondary toothed element 410 may be a rack.

In particular, FIG. 2A has a locking mechanism wherein a switch is connected to a wedge 42. The wedge may be slidably attached to the base 4.

FIG. 2B shows a detail of the locking mechanism and biasing elements provided in an example. In the example of FIG. 2B, a movement of the wedge 42 in an unlocking direction M causes the gear assembly to partially or completely disengage thereby allowing the primary toothed element 22 to move relative to the secondary toothed element 410. In the locked position (as shown in FIG. 2A), the wedge pushes the secondary toothed element towards the primary toothed element so as to engage the primary toothed element 22 thereby blocking the movement of the primary toothed element 22 due to its attachment to the base 4 by the action of the wedge 42.

Also, in the example of FIG. 2B, several biasing elements are provided. An elastic member 21 is provided, as in the examples of FIGS. 1A, 1B, and 1C, for exerting a first biasing force B1 on the grip portion 2 away from the base 4. In this way, the user may unlock the locking mechanism, and the pointing device 1 may be biased towards its most voluminous geometry. The user may decrease the volume of the pointing device by pushing the grip portion 2 towards the base 4.

Another biasing element may be provided on the second toothed element 410 so that the second toothed element 410 is provided with an elastic component that exerts a second biasing force B2 to disengage from the primary toothed element 22 thereby allowing a relative movement between the primary toothed element 22 and the secondary toothed element 410 when the switch is the unlocked position, i.e., the second biasing force B2 allows for, at least, a partial disengagement of the gear assembly when the switch is in the unlocked position, thereby allowing a user to modify the relative distances between the elements of the gear assembly. This may be accomplished by embedding or manufacturing the secondary toothed element with an elastic material (as may be the case for the secondary toothed element of FIGS. 1A, 1B, and 1C) or by adding a spring-like element attached to the secondary toothed element 410 or to its associated hinge 411.

A further biasing element may be provided on the wedge 42, for example, to bias it towards the locked position, i.e., a direction opposite to the unlocking direction M.

FIG. 2C shows a pointing device 1 according to an example wherein the pointing device is shown in two possible positions to adapt to different users, e.g., to accommodate their ergonomics. In a first position, drawn in solid lines, the wedge 42 locks the adjusting mechanism 20 in a position wherein the pointing device occupies a larger volume. In a second position, shown in dashed lines, the pointing device is adjusted by the adjusting mechanism 20 to occupy a smaller volume.

In the first position, an extended grip portion 2' of the pointing device 1 is achieved by biasing the grip portion away from the base 4 by an elongated elastic member 21' being such elongated elastic member 21' in an elongated position. Also, the primary toothed element 22' is engaged with the secondary toothed element 410 by engaging some of the teeth of the primary toothed element 22' between corresponding teeth of the secondary toothed element 410. Given that the wedge 42 is in the locked position (pushing the primary toothed element 22' and the secondary toothed element 410 together) a pushing force of the user on the grip portion 2' would not modify the position of the adjusting mechanism, i.e., would not modify the position of the elongated elastic member 21'.

A movement of the wedge in the unlocking direction M, and, optionally a biasing force in the associated hinge 411 of the secondary toothed element 410 causes the gear assembly to, at least, partially disengage and allow a change in the relative position between the primary toothed element 22' and the secondary toothed element 410.

For example, a pushing force of the elongated grip portion 2' may cause a compression on the elongated elastic member 21' thereby achieving the movement of the grip portion to a compressed grip portion 2" wherein the elastic member is now a compressed elastic member 21". As can be seen for FIG. 2C, there is a change in the relative position between the gear assembly, i.e., between the primary toothed element 22' and the secondary toothed element 410 corresponding to the elongated grip portion 2' and the relative position corresponding to the compressed grip portion 2".

While the grip portion is in the form of a compressed grip portion 2" and the wedge 42 is in the locked position, the gear assembly is locked, thereby preventing the elastic member from further compressing or elongating.

An adjustable pointing device, such as a mouse, is disclosed that comprises a base, a grip portion installed on the base, and an adjusting mechanism to define a separation distance between the base and the grip portion, the adjusting mechanism comprising:
  a column intermediate to the base and the grip portion, the column thereby defining the separation distance;
  a locking assembly having a primary toothed element with several teeth and a secondary toothed element with at least one tooth complementary to the teeth of the primary toothed element;

wherein the locking assembly is attached to the column so that a modification of the separation distance causes a relative movement between the primary toothed element and the secondary toothed element and wherein the adjusting mechanism further comprises a switch to block the relative position between the primary toothed element and the secondary toothed element.

In an example, the column comprises an elastic member, for example, a spring like element that may have at least one elongated position and a compressed position. Furthermore, the elastic member may be to bias the column away from the base.

In a further example, at least one of the primary toothed element or the secondary toothed element is a pinion or a section of a pinion. Also, at least one of the primary toothed element or the secondary toothed element may be, e.g., a rack.

As for the switch, it may be attached to the base, and it may be slidable between a locked position and an unlocked position. The switch may also be located on the base. In the locked position, the switch may lock the relative position between the primary toothed element and the secondary toothed element by connecting at least one of the primary toothed element or the secondary toothed element to the base. This may be achieved by acting as an intermediary to engage the primary toothed element to a secondary toothed element that is connected to the base.

In an example, to further change the geometry of the device not only by occupying a different volume but also by performing other changes on the geometry of the pointing device, the grip portion may comprise a hinge attached to a structural element of the pointing device, i.e., an element fixed with respect to the base. The hinge may be to modify the inclination of the grip portion with respect to the base.

Furthermore, the device may comprise a second grip portion installed on the base. The second grip portion may be, e.g., fixedly attached to the base and comprise the controls for user input such as switches, scroll wheels, etc.

Also, an adjustable pointing device is disclosed wherein it comprises a base, a grip portion, and an adjusting mechanism, the grip portion being attached to the base by the adjusting mechanism wherein the adjusting mechanism comprises an elastic member biasing the grip portion away from the base and comprising a locking mechanism movable between a locked position in which the locking mechanism is to prevent the grip portion from moving relative to the base and an unlocked position in which the locking mechanism is to allow the grip portion to move relative to the base.

A modification of the relative position between the grip portion and the base may, for example, cause a relative movement on a gear assembly, i.e., between a primary toothed element and a secondary toothed element of the gear assembly. Also, the locking mechanism may be provided to, while in the locked position, block the gear mechanism and prevent the movement between the grip portion and the base.

The primary toothed element and/or the secondary toothed element may be a pinion or a rack and the locking mechanism may be to engage and, at least, partially disengage the gear assembly and may be slidably attached to the base.

The invention claimed is:

1. An adjustable pointing device, comprising:
 a base;
 a first grip portion installed on the base;
 a second grip portion proximate to the first grip portion that includes input elements associated with the pointing device, wherein the second grip portion maintains a fixed distance with the base during modification of a separation distance between the base and the first grip portion; and
 an adjusting mechanism to define the separation distance between the base and the first grip portion, the adjusting mechanism comprising:
  a column with an elastic member intermediate to the base and the first grip portion, the column thereby defining the separation distance and the elastic member applying a biasing force on the first grip portion away from the base; and
  a locking assembly having a primary toothed element with a plurality of teeth and a secondary toothed element with a tooth complementary to the plurality of teeth of the primary toothed element, wherein:
   the locking assembly is attached to the column so that a modification of the separation distance causes a relative movement between the primary toothed element and the secondary toothed element to allow the elastic member to move the first grip portion away from the base through the biasing force; and
   the adjusting mechanism further comprises a switch to lock a relative position between the primary toothed element and the secondary toothed element to prevent the elastic member from moving the first grip portion away from the base through the biasing force.

2. The pointing device of claim 1, wherein the column comprises an elastic member biases the first grip portion towards its most voluminous geometry.

3. The pointing device of claim 2, wherein pressure is applied to the elastic member to decrease a volume of the pointing device when the elastic member is allowed to move.

4. The pointing device of claim 1, wherein at least one of the primary toothed element or the secondary toothed element is a pinion.

5. The pointing device of claim 1, wherein at least one of the primary toothed element or the secondary toothed element is a rack.

6. The pointing device of claim 1, wherein the switch is attached to the base and the switch is slidable between a locked position and an unlocked position.

7. The pointing device of claim 6, wherein, in the locked position, the switch locks the relative position between the primary toothed element and the secondary toothed element by connecting at least one of the primary toothed element or the secondary toothed element to the base.

8. The pointing device of claim 1, wherein the switch is located on the base.

9. The pointing device of claim 1 wherein the first grip portion further comprises a hinge for attachment to the base, and wherein the hinge is to modify an inclination of the first grip portion.

10. The pointing device of claim 9, wherein the hinge is located in an intermediate structure between the base and the first grip portion.

11. The pointing device of claim 1, wherein the second grip portion is fixedly attached to the base.

12. An adjustable pointing device that comprises:
 a base;
 a first grip portion attached to the base by an adjusting mechanism;
 a second grip portion proximate to the first grip portion that includes input elements associated with the pointing device, wherein the second grip portion maintains a fixed distance with the base when the first grip portion is moved relative to the base; and the adjusting mechanism attached between the base and the first grip portion, wherein the adjusting mechanism comprises a column with an elastic member biasing the first grip portion away from the base and comprising a locking mechanism movable between a locked position in which the locking mechanism is to prevent the elastic member from moving the first grip portion relative to the base and an unlocked position in which the locking mechanism is to allow the elastic member to move the first grip portion relative to the base.

13. The pointing device of claim 12, wherein a movement of the first grip portion relative to the base causes a relative movement between a primary toothed element and a secondary toothed element of a gear assembly being the locking mechanism to block the gear assembly while in the locked position.

14. The pointing device of claim 13, wherein the primary toothed element and/or the secondary toothed element is a pinion or a rack.

15. The pointing device of claim 12, wherein the locking mechanism is slidably attached to the base.

\* \* \* \* \*